United States Patent

Ho

[11] Patent Number: 6,144,135
[45] Date of Patent: Nov. 7, 2000

[54] STATOR STRUCTURE FOR A DIRECT-CURRENT FAN MOTOR

[76] Inventor: Jsewen Ho, P.O. Box 82-144, Taiwan, Taiwan

[21] Appl. No.: 09/190,162

[22] Filed: Nov. 12, 1998

[51] Int. Cl.[7] .................................................. H02K 1/12
[52] U.S. Cl. .......................... 310/254; 310/194; 310/91; 310/258
[58] Field of Search .............................. 310/42, 66, 67 R, 310/177, 179, 216, 218, 91, 254, 258, 264, 269; 29/596, 598, 605, 606, 609

[56] References Cited

U.S. PATENT DOCUMENTS

| | | | |
|---|---|---|---|
| 4,818,911 | 4/1989 | Taguchi et al. | 310/259 |
| 4,894,572 | 1/1990 | Shiraki | 310/68 B |
| 4,975,611 | 12/1990 | Rochester | 310/194 |
| 5,093,599 | 3/1992 | Horng | 310/254 |
| 5,708,406 | 1/1998 | Tsunoda et al. | 335/272 |
| 5,821,654 | 10/1998 | Woo | 310/90 |
| 5,895,994 | 4/1999 | Molnar rt al. | 310/215 |
| 5,923,110 | 7/1999 | Zhao et al. | 310/91 |

*Primary Examiner*—Nicholas Ponomarenko
*Assistant Examiner*—Tran N Nguyen
*Attorney, Agent, or Firm*—A & J

[57] ABSTRACT

A stator structure for a direct-current fan motor includes a stator seat, a spindle position thereof being provided with a permeability tube. An even number of winding regions is distributed uniformly around the outer periphery of the permeability tube. The winding regions receive coil windings and each has a hollow interior for receiving a magnetic pole inserted thereinto. One side of the spindle of the stator seat is provided with substrate barbs and frame barbs that secure a circuit board and position the stator structure on a frame.

1 Claim, 3 Drawing Sheets

STATOR STRUCTURE FOR A DIRECT-CURRENT FAN MOTOR

BACKGROUND OF THE INVENTION

1. Field of the Invention

The present invention relates to a stator structure, and more particularly to a stator structure for a direct-current fan motor.

2. Description of the Prior Art

A conventional direct-current fan motor basically comprises a stator structure, a rotor structure, and a frame. There has been developed in recent years a kind of compact direct-current fan motor used in combination with semiconductors, eliminating the use of the frame and minimizing the size of the stator and rotor structures to achieve size reduction.

According to the working principle of direct-current fan motors, the stator structure is employed to control a circuit board to cause a coil to generate intermittent connection. Therefore, there form an alternating field on the magnetic pole. The alternating field may be regarded as a rotating magnetic field. The inter-repulsion between the alternating field and the magnetic field generated by an annular rubber magnet on the rotor structure drives the rotor.

As for the conventional stator structure of direct-current fan motors, there are different coil winding methods, which can be divided into two main types. In the first type, the coil is wound along the external diameter of the spindle of the stator structure; then magnetic plates are provided on both sides of the coil. However, although this method makes coil winding relatively convenient, the polar area of the magnetic pole is relatively small. Relatively, the magnetic flux is also small, so that the electromechanical characteristics are relatively poor. In the second type, silicon steel sheets are punched to form integrally magnetic plates in a radial shape. The method of winding is along gaps between magnetic poles, and the coil is wound around the yoke of the magnetic pole. However, although the polar area of the magnetic pole is relatively large, and there is relatively more magnetic flux, since the gaps between adjacent magnetic poles are narrow, the distribution of coil windings is not uniform. Besides, during winding, the lead wire is likely to be cut by sharp edges of the magnetic poles, resulting in high wire cutting rates. Consequently, the rate of faulty products is also high.

SUMMARY OF THE INVENTION

The present invention relates to a stator structure, and more particularly to a stator structure for a direct-current fan motor.

A primary object of the present invention is to provide a stator structure for a direct-current fan motor, which utilizes a stator seat as a major structural component. The present invention aims to improve considerably the winding of coils and installation of magnetic poles, as well as installation of the entire direct-current fan motor and the electromechanical characteristics thereof.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
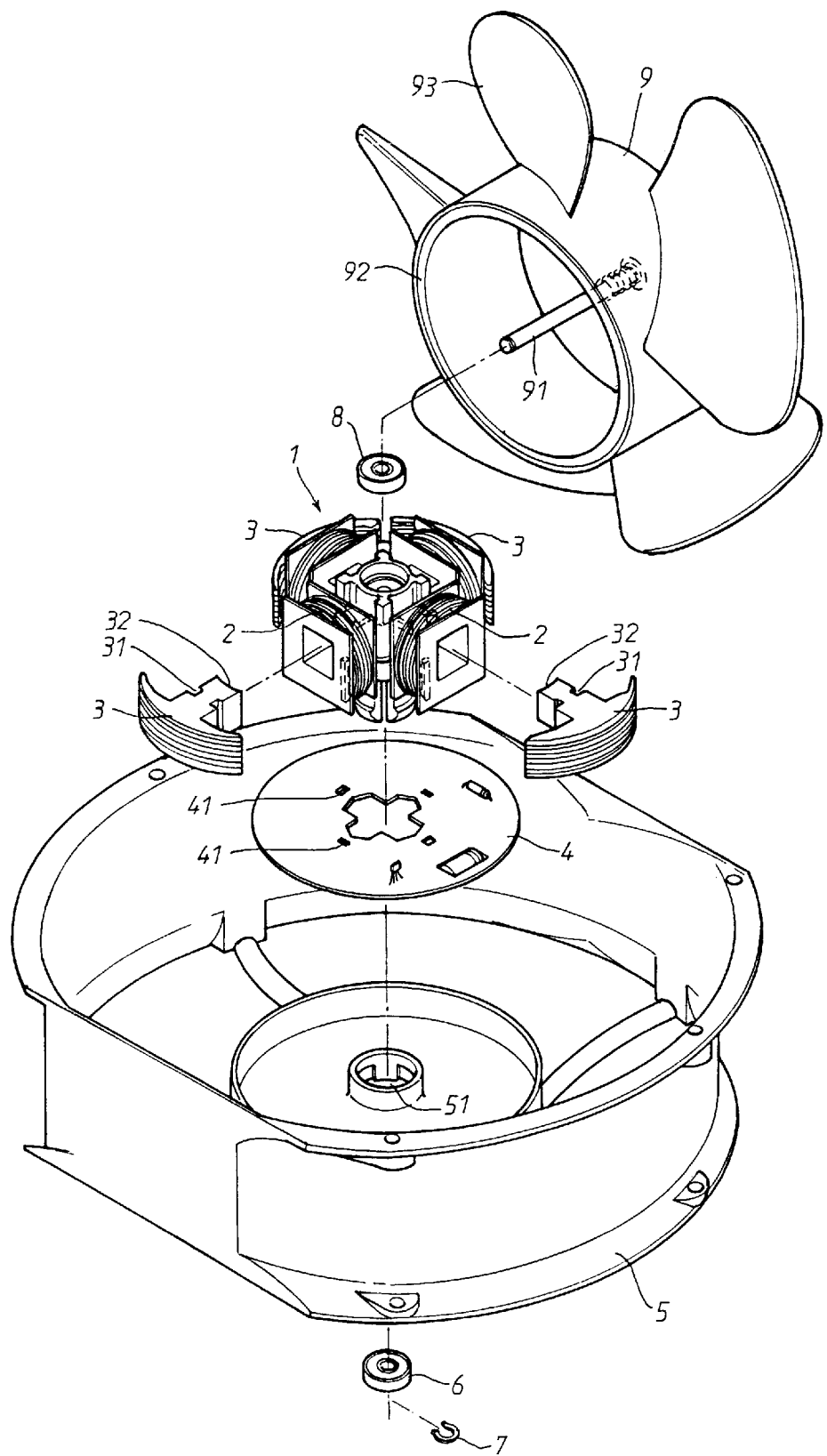
FIG. 1 is a perspective exploded view of the present invention.
Figure 2:
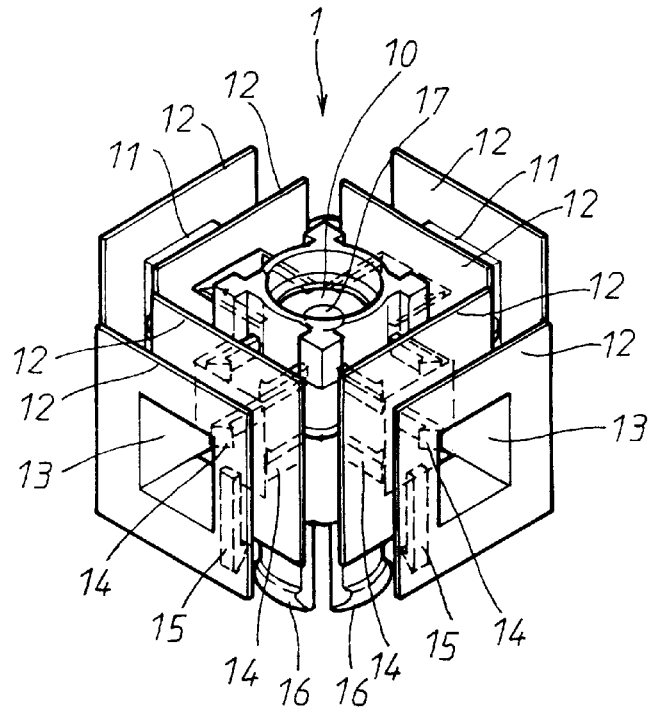
FIG. 2 is a perspective view of a stator seat according to the present invention.
Figure 3:
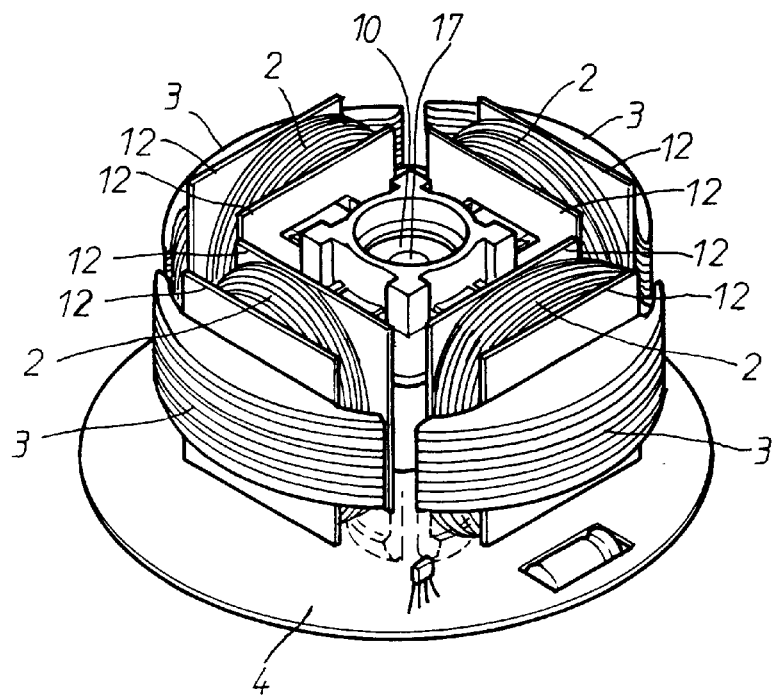
FIG. 3 is a perspective view of the stator structure according to the present invention.

With reference to FIGS. 1, 2, and 3, a preferred embodiment of a stator structure for direct-current fan motors according to the present invention essentially comprises a stator seat 1. The stator seat 1 has a spindle provided with a permeability tube 10. The permeability tube 10 is formed integrally by using injection molding. The permeability tube 10 is wrapped directly in the position of the spindle of the stator seat 1. Alternatively, the permeability tube 10 may also be insertably coupled to the position of the spindle of the stator seat 1. In the present invention, as the permeability tube 10 is formed integrally using injection molding, it has higher precision and better stability.

An even number of winding regions 11 are evenly distributed on the outer periphery of the permeability tube 10 based on the outer diameter of the permeability tube 10. The number of the winding regions 11 is divisible by two, i.e., 2, 4, 6, 8, 10.

Upright walls 12 are erected on both sides of the respective winding regions 11 such that the winding region 11 between two adjacent walls 12 allows the lead wires to be wound uniformly around the winding region 11 to form a coil winding 2.

Each winding region 11 has an interior that is a hollow through hole 13, which leads to the permeability tube 10. The through hole 13 receives the corresponding magnetic pole 3 inserted thereinto for coupling purposes. The interior of the through hole 13 is provided with a barb 14 for engaging indentations 31 on both sides of the magnetic pole 3 so that a curved face 32 on the bottom portion of the magnetic pole can adhere closely to the outer periphery of the permeability tube 10.

One side of the spindle of the stator seat 1 is provided with substrate barbs 15 and frame barbs 16. Substrate barbs 15 engage retaining hooks of slots 41 of a circuit board 4. Frame barbs 16 engage and are secured in the position of a shaft hole 51 of a frame 5. A bearing 6 or metal axle sleeve is squeezed tightly into the inner peripheries of the frame barbs 16 from the outer side of the frame 5 so that the frame barbs 16 expand outwardly to engage tightly the shaft hole 51 of the frame 5. At the same time, the bearing 6 or metal axle sleeve is provided to couple with a rotary shaft 91 of a rotor 9 for operation purposes.

The other side of the permeability tube of the stator seat 1 can be squeezed tightly into another bearing 8 or metal axle sleeve 8. And the center of the permeability tube 10 is provided with a shaft hole 17. The bearing 8 and shaft hole 17 receive the rotary shaft of the rotor. The rotary shaft projects from the bearing 6 and is secured in position by a C-clip 7.

Figure 4:
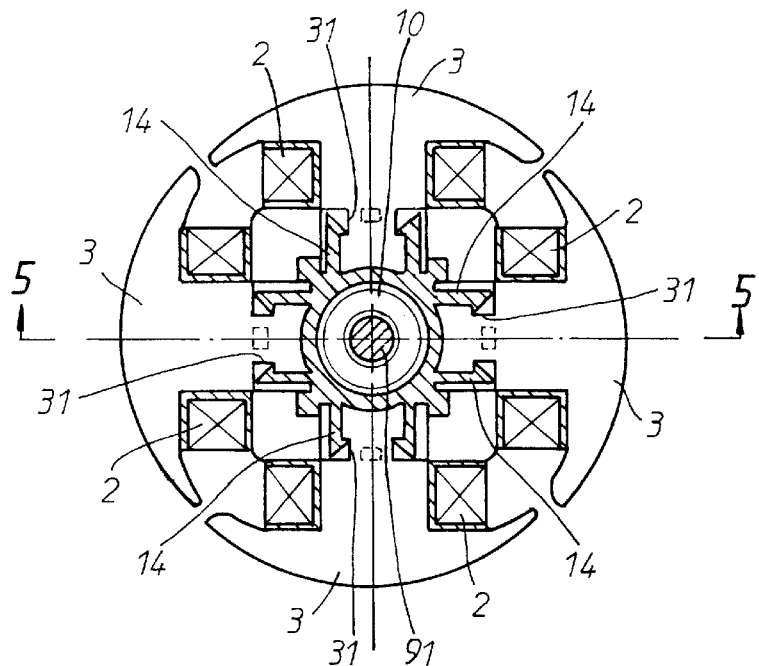
FIG. 4 is a sectional view of the stator structure according to the present invention.
Figure 5:
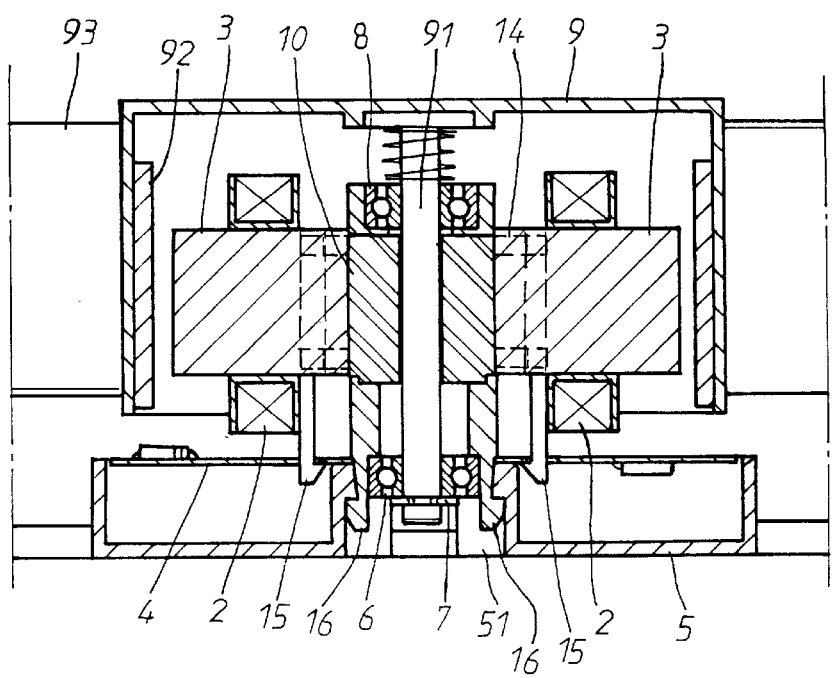
FIG. 5 is a sectional view taken along line 5—5 of FIG. 4.

With further reference to FIGS. 1, 4, and 5, the spindle position of the stator seat 1 of the present invention is provided with the permeability tube 10. The permeability tube 10 is made of material of high magnetic conductance coefficient. Lead wire can be distributed uniformly on the winding regions 11 of the stator seat 10 to form coils 2. Since there are no magnetic poles 3 to pose an obstacle during winding work on the winding regions, the winding work can proceed quickly and smoothly, thus reducing the possibility of wire snapping considerably. Furthermore, since the winding regions 11 are wide and even, the lead wires can be wound neatly and orderly in layers, so that the position of the lead wires of the coils 2 of the winding regions 11 are consistent. In this way, the resistance error of coils 2 is small, and the field distribution is relatively uniform. The imbalance caused by magnetic power is also reduced. Therefore, shaking of the rotor during operation can be reduced, frictional coefficient of the rotary improved. Relatively, the noise index of the motor can be lowered, and service life of the motor lengthened.

After winding, the magnetic poles 3 are inserted and secured in the corresponding through holes 13. By using the barbs 14 inside the through holes 13 to engage the indentations 31 on both sides of the magnetic poles 3, the curved faces 32 on the bottom portions of the magnetic poles 3 can adhere tightly to the outer periphery of the permeability tube 10. Then the slots 41 of the circuit board 4 are insertably secured on the substrate barbs 15 of the stator seat 1 to accomplish a stator structure.

After assembly of the stator structure, the frame barbs 16 of the stator seat 1 is used to engage the shaft hole 51 of the frame 5, and the bearing 6 is squeezed tightly into the inner peripheries of the frame barbs 16 from the outside of the shaft hole 51 of the frame 5. The bearing 6 will force the frame barbs 16 to expand outwardly so that the frame barbs 16 can be secured positively in the position of the shaft hole 51 of the frame 5, thus achieving coupling of the frame 5 and the stator structure.

Lastly, the other side of the permeability tube 10 of the stator seat 1 is placed tightly into the bearing 8, and the rotary shaft 91 of the rotor is fitted in order through the bearing 8, the central shaft hole 17 of the permeability tube 10, and the bearing 6, with a front end projecting from the bearing 6. Then the C-clip 7 is used to fasten and secure the front end of the rotary shaft 91 to accomplish assembly of the fan motor.

After assembly of the fan motor of the present invention and connection of electric power, the coils 2 of the stator structure will generate an alternating field which, through the conductance of the magnetic poles 3 and the interrepulsion of magnetic rings 92 of the rotor, drives the rotor 9 to rotate, so that vanes 93 of the rotor rotate to generate wind.

The stator structure formed essentially by the stator seat 1 in combination with the coils 2 and magnetic poles 3 has the following advantages in comparison with the prior art:

1. Silicon steel materials for making the stator and magnetic poles can be saved. Scraps formed during punching of silicon steel sheets can also be reduced.
2. Rate of wire snapping during winding operations can be considerably lowered.
3. Arrangement of coils is more uniform and neat. The resistance error of coils is small so that the magnetic field characteristics generated by the coils are relatively uniform, which can reduce imbalance of magnetic power, reduce shaking of rotor, lower the frictional coefficient and noise index, and prolong the service life of the motor.
4. If the magnetic poles are damaged or faulty during manufacture, they can be replaced or repaired in part, unlike the prior art which will need to dispose of the entire magnetic pole. Hence, material consumption can be reduced.
5. If the shape or angle of the magnetic poles have to be changed, it is only necessary to change the magnetic poles without replacing the other components of the stator seat, unlike the prior art which requires the stator structure to be made anew. Hence, material consumption can be reduced. In summary, the present invention utilizes a stator seat to couple with components including coils, magnetic poles, and circuit board to achieve a stator structure for fan motors. And the stator structure is coupled with other components including a frame, a rotor and bearings to achieve a fan motor. It can therefore be appreciated that assembly of fan motors is very smooth and quick.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A stator structure for a direct-current fan motor, essentially comprising a stator seat having a spindle, said stator being provided with a magnetic permeability tube in a spindle position, an outer periphery of said spindle of said stator seat being provided with a plurality of winding regions around which coil windings may be wound, said winding regions each having an interior that is a hollow through hole, said through hole receiving a magnetic pole inserted and secured therein, one side of said spindle of said stator seat being provided with substrate barbs and frame barbs that can respectively secure a circuit board, said stator structure being secured on a frame of said fan motor, said magnetic permeability tube being formed integrally and covering directly said spindle position of said stator seat, said permeability tube being secured in and coupled to said spindle position of said stator seat by means of insertion, projecting walls are erected on both sides of each of said winding regions respectively, such that a coil may be wound in between two adjacent walls, said through hole being internally provided with a fame barb that can retain and secure said magnetic pole, said magnetic pole having a bottom portion that is curved so that it can adhere tightly to an external periphery of said permeability tube, inner peripheries of said frame barbs receiving a bearing or a metal axle sleeve, one end of said permeability tube of said stator seat receiving a bearing or a metal axle sleeve.

* * * * *